United States Patent
Kobayashi et al.

(10) Patent No.: US 6,297,303 B1
(45) Date of Patent: Oct. 2, 2001

(54) DISPERSIBILITY IMPROVER FOR FLUORORESIN POWDERS, AND ORGANIC RESIN COMPOSITIONS

(75) Inventors: Hideki Kobayashi; Toru Masatomi, both of Chiba Prefecture (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 09/345,542

(22) Filed: Jun. 30, 1999

(30) Foreign Application Priority Data

Jun. 30, 1998 (JP) ................................. 10-199857
Oct. 28, 1998 (JP) ................................. 10-306509

(51) Int. Cl.[7] ............................. C08L 83/08; C08G 77/24
(52) U.S. Cl. ......................... 524/263; 524/261; 524/265; 524/266; 524/267; 524/268; 524/462; 524/545; 524/568; 528/25; 528/26; 528/29; 528/31; 528/42; 556/454; 556/457
(58) Field of Search ............................. 528/25, 26, 29, 528/31, 42; 524/261, 263, 265, 266, 267, 268, 462, 545, 588; 556/454, 457

(56) References Cited

U.S. PATENT DOCUMENTS

| | | | |
|---|---|---|---|
| 4,748,225 | * 5/1988 | Yoshioka et al. | ........................ 528/26 |
| 5,047,491 | * 9/1991 | Saho et al. | ........................ 528/15 |
| 5,908,950 | * 6/1999 | Cooke et al. | ........................ 556/448 |

FOREIGN PATENT DOCUMENTS

| | | | |
|---|---|---|---|
| 0319290A | 6/1989 | (EP) | .............. C08L/101/00 |
| 0811650 | * 12/1997 | (EP) . | |
| 0811650A | 12/1997 | (EP) | .............. C08G/77/46 |
| 0969329A | 1/2000 | (EP) | .............. G03G/5/147 |
| 9-286911 | 11/1997 | (JP) | .............. C08L/69/00 |

OTHER PUBLICATIONS

Kobayashi et al., "Perfluoroalkyl–containing siloxane–based dispersing agents for powdered fluoropolymers, the powdered polymers as modifiers for organic resins, and modified organic resins"; STN Chemical Abstracts, XX, XX, vol. 132, 2000, XP002143287 & Database WPI, Derwent Publications Ltd., London, GB; AN 2000–390124 *abstract*.

Kobayashi et al., "Perfluoroalkyl–substituted polysiloxanes" STN Chemical Abstracts, XX,XX, vol. 132, 2000, XP002143288 & Database WPI; Derwent Publications Ltd., London GB; AN 2000–390123 *abstract*.

Database WPI, Derwent Publications Ltd., London, GB; AN 2000–286823;XP002146493 & JP 2000 080232 A (Dow Corning Toray Silicone), Mar. 21, 2000 *abstract*.

* cited by examiner

Primary Examiner—Robert Dawson
Assistant Examiner—Jeffrey B Robertson
(74) Attorney, Agent, or Firm—Sharon K. Severance; Larry A. Milco; Charles R. Richard

(57) ABSTRACT

The invention pertains to a polydiorganosiloxane dispersibility improver for fluororesin powders that contains in the pendant position (A) an organic group selected from the set consisting of polyoxyalkylene-functional organic groups, alkyl groups having at least 12 carbon atoms, and polydialkylsiloxane chain-containing organic groups, and contains in the pendant position or the molecular chain terminal position, (B) a perfluoroalkyl-functional organic group with the general formula $F(CF_2)_a$—$R^1$— in which $R^1$ is alkylene or alkyleneoxyalkylene and a is an integer with a value of at least 3.

The polydiorganosiloxane dispersibility improver for fluororesin powders has the ability to induce the uniform dispersion of fluororesin powders in organic resins. As a consequence the organic resin compositions have the ability to form uniform and transparent coatings that have an excellent surface lubricity.

14 Claims, No Drawings

DISPERSIBILITY IMPROVER FOR FLUORORESIN POWDERS, AND ORGANIC RESIN COMPOSITIONS

FIELD OF THE INVENTION

This invention relates to a polydiorganosiloxane dispersibility improver for fluororesin powders; an organic resin modifier comprising the polydiorganosiloxane dispersibility improver and fluororesin powder and to organic resin compositions that contain the polydiorganosiloxane dispersibility improver.

BACKGROUND OF THE INVENTION

The admixture of a fluororesin powder, e.g., Teflon™ powder, into organic resins is an already known strategy for improving the physical properties of organic resins. For example, Japanese Laid Open (Kokai or Unexamined) Patent Application Number Hei 9-286911 (286,911/1997) teaches the preparation of a highly impact-resistant polycarbonate resin composition by the addition of fibrillar polytetrafluoroethylene powder to polycarbonate resin. However, since fluororesin powders generally have low surface tensions, it has been quite difficult to achieve homogeneous dispersions of fluororesin powders in high surface tension organic resins. As a result, there has been desire for the appearance of a method for inducing the homogeneous dispersion of fluororesin powders in organic resins.

It is an object of this invention is to provide a polydiorganosiloxane dispersibility improver for fluororesin powders that has the ability to induce the uniform dispersion of fluororesin powders in organic resins.

Another object of this invention is to provide a organic resin modifier suitable for modifying the water and oil repellency of organic resin surfaces wherein the organic resin modifier comprises a blend of the polydiorganosiloxane dispersibility improver and fluororesin powder.

Another object of the present invention is to provide organic resin compositions that contain the dispersibility improver and as a consequence have the ability to form uniform and transparent coatings that have an excellent surface lubricity.

SUMMARY OF THE INVENTION

This invention relates to a polydiorganosiloxane dispersibility improver for fluororesin powders, wherein the polydiorganosiloxane contains in pendant position (A) at least one organic group selected from the group consisting of polyoxyalkylene-functional organic groups, alkyl groups having at least 12 carbon atoms, and polydialkylsiloxane chain-containing organic groups, and contains in pendant position or molecular chain terminal position, (B) at least one perfluoroalkyl-functional organic group with the general formula $F(CF_2)_a$—$R^1$— in which $R^1$ is alkylene or alkyleneoxyalkylene and a is an integer with a value of at least 3.

This invention also pertains to an organic resin modifier comprising a fluororesin powder and the polydiorganosiloxane dispersibility improver. This invention also relates to organic resin compositions that contain the polydiorganosiloxane dispersibility improver.

DETAILED DESCRIPTION OF THE INVENTION

The polydiorganosiloxane dispersibility improver contains in pendant position (A) at least one organic group selected from the group consisting of polyoxyalkylene-functional organic groups, alkyl groups having at least 12 carbon atoms, and polydialkylsiloxane chain-containing organic groups and also contains, in pendant position or molecular chain terminal position, (B) at least one perfluoroalkyl-functional organic group with the general formula $F(CF_2)_a$—$R^1$— in which $R^1$ is alkylene or alkyleneoxyalkylene and a is an integer with a value of at least 3.

The polyoxyalkylene-functional organic group can be expressed by the general formula —$(R^2)_b$—O—$(R^3O)_c$—$R^4$ in which $R^2$ is a divalent hydrocarbon group; $R^3$ is a $C_1$ to $C_4$ divalent hydrocarbon group; $R^4$ is the hydrogen atom, a monovalent hydrocarbon group, or an acyl group; b is 0 or 1; and c is an integer from 1 to 300 and preferably is an integer with a value of at least 5. This polyoxyalkylene-functional organic group can be specifically exemplified by the following:

—$C_3H_6O(C_2H_4O)_{12}CH_3$,

—$C_3H_6O(C_3H_6O)_{20}CH_3$,

—$C_3H_6O(C_2H_4O)_6(C_3H_6O)_{20}CH_3$,

—$C_3H_6O(C_2H_4O)_{20}H$,

—$C_3H_6O(C_3H_6O)_{40}H$,

—$C_3H_6O(C_2H_4O)_{20}(C_3H_6O)_{20}H$,

—$C_3H_6O(C_3H_6O)_{40}COCH_3$, and

—$C_3H_6O(C_2H_4O)_{20}(C_3H_6O)_{20}COCH_3$.

The alkyl having at least 12 carbons can be exemplified by n-dodecyl, n-tetradecyl, n-hexadecyl, and n-octadecyl.

The polydialkylsiloxane chain-containing organic group in pendant position can be exemplified by alkylene or alkyleneoxyalkylene to which a polydimethylsiloxane chain is bonded. The polydialkylsiloxane preferably has a degree of polymerization of at least 5. The polydialkylsiloxane chain-containing organic group can be exemplified by groups with the following general formula

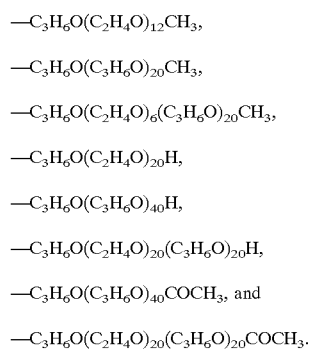

in which $R^1$ is alkylene or alkyleneoxyalkylene, R is a substituted or unsubstituted monovalent hydrocarbon group, and d is an integer with a value from 1 to 500. This group can be specifically exemplified by groups with the following formulas in which Me is an abbreviation for the methyl group.

—$C_2H_4\{Me_2SiO\}_{40}Me_2SiC_4H_9$

—$C_2H_4\{Me_2SiO\}_{50}SiMe_3$

—$C_3H_6\{Me_2SiO\}_{40}Me_2SiC_4H_9$

—$C_2H_4\{Me_2SiO\}_{60}SiMe_3$.

The perfluoroalkyl-functional organic group (B) has the general formula $F(CF_2)_a$—$R^1$— in which $R^1$ is alkylene or alkyleneoxyalkylene and a is an integer with a value of at least 3, preferably a value in the range from 4 to 10. The alkylene encompassed by $R^1$ is preferably ethylene or propylene, while the alkyleneoxyalkylene encompassed by $R^1$ can be exemplified by ethyleneoxyethylene, ethyleneoxypropylene, and propyleneoxypropylene. The subject perfluoroalkyl-functional organic group can be specifically exemplified by groups with the following formulas.

—$C_2H_4C_4F_9$

—$C_2H_4C_6F_{13}$

—$C_2H_4C_8F_{17}$

—$C_3H_6C_4F_9$

—$C_2H_4OC_2H_4C_8F_{17}$.

The polydiorganosiloxane dispersibility improver can be exemplified by compounds with the following average formula.

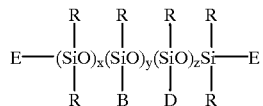

R in this general formula denotes substituted or unsubstituted monovalent hydrocarbon groups and can be specifically exemplified by $C_1$ to $C_{30}$ alkyl, alkenyl, aryl, and arylalkyl. Methyl and phenyl are preferred for R.

B is the perfluoroalkyl-functional organic group with the general formula $F(CF_2)_a$—$R^1$— in which $R^1$ is alkylene or alkyleneoxyalkylene and a is an integer with a value of at least 3.

D is an organic group selected from polyoxyalkylene-functional organic groups, alkyl groups having at least 12 carbon atoms, and polydialkylsiloxane chain-containing organic groups.

E is a group selected from R, B, and D.

x is a number with a value from 0 to 500, y is a number from 1 to 500, z is a number from 1 to 500, and (x+y+z) preferably falls in the range from 2 to 1500, more preferably 5 to 1,000. When one side of this diorganopolysiloxane (e.g. (E)) is the perfluoroalkyl-functional organic group (B), y may be 0.

The polydiorganosiloxane dispersibility improver is preferably a polydiorganosiloxane in which the perfluoroalkyl-functional organic group (B) and the fluorine-free substituent constituting the organic group (A) are disposed as grafted chains along a siloxane main chain.

The polydiorganosiloxane dispersibility improver can be exemplified by the following compounds.

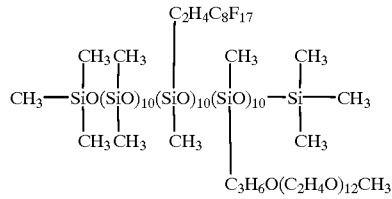

-continued

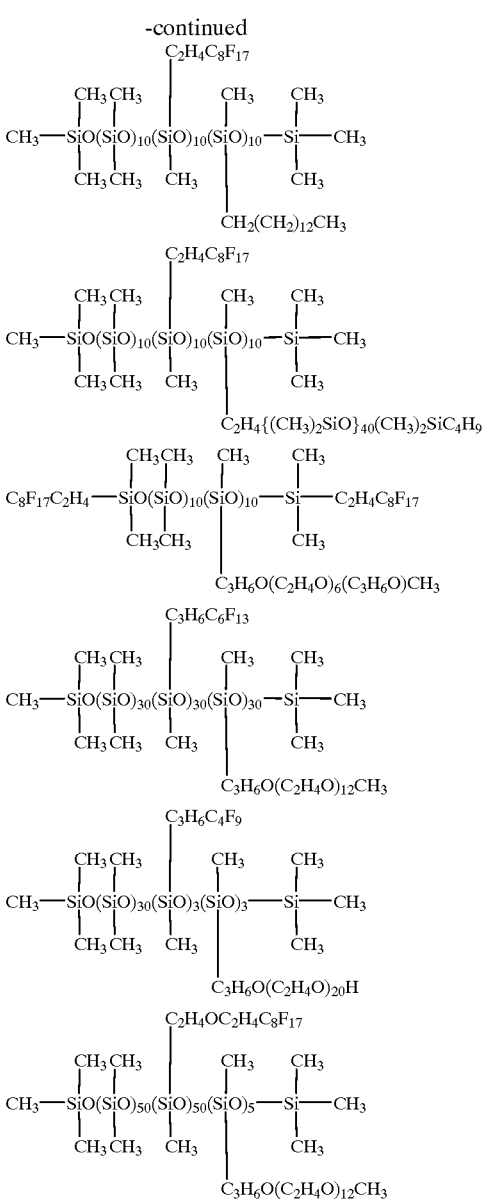

The polydiorganosiloxane dispersibility improver can be synthesized by the addition reaction, for example, of polysiloxane with the following average compositional formula

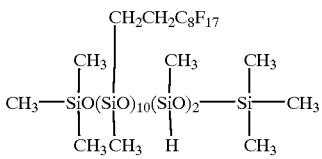

with, for example, the alkenyl-functional polyoxyalkylene compound $CH_2=CHCH_2O(C_2H_4O)_{10}H$, or an alkenyl-functional hydrocarbon compound such as an α-olefin, or a vinyl-functional dimethylpolysiloxane such as $CH_2=CH\{(CH_3)_2SiO\}_{40}(CH_3)_2SiR'$ (R'=monovalent hydrocarbon groups), by heating in the presence of a catalyst, for example, chloroplatinic acid, and optionally in an organic solvent.

The polydiorganosiloxane dispersibility improver has a molecular weight preferably in the range from 1,000 to 1 million and particularly preferably in the range from 10,000 to 100,000. The fluorine content of this polydiorganosiloxane is preferably from 1 to 70 weight % and more preferably from 5 to 50 weight %. Polydiorganosiloxane containing less than 1 weight % fluorine is unable to fully manifest the capacity to stabilize the dispersion of fluororesin powders. A fluorine content in excess of 70 weight % results in poor compatibility with organic resins.

The organic resin modifier comprises a fluororesin powder (II) and the polydiorganosiloxane dispersibility improver (III). The fluororesin powder (II) may be exemplified by tetrafluoroethylene resin powders, chlorotrifluoroethylene resin powders, tetrafluoroethylene-hexafluoroethylenepropylene resin powders, vinyl fluoride resin powders, vinylidene fluoride resin powders, and dichlorodifluoroethylene resin powders.

The proportions of (II) and (III) cannot be specifically delineated since they will vary as a function of the type and properties of the particular organic resin. However, as a general matter, the use is preferred of 0.1 to 30 weight parts polyorganosiloxane (III) for each 100 weight parts fluororesin powder (II).

An organic solvent may be added on an optional basis to the organic resin modifier. This solvent can be exemplified by chlorinated hydrocarbons such as dichloromethane, 1,2-dichloroethane, 1,1,2,2-tetrachloroethane, chloroform, 1,1,1-trichloroethane, carbon tetrachloride, monochlorobenzene, and dichlorobenzene; aromatic hydrocarbons such as benzene, toluene, xylene, and ethylbenzene; and ethers such as diethyl ether. Combinations of two or more of these organic solvents can also be used. The organic resin modifier according to the present invention can be prepared by the usual mixing methodologies. For example, the fluororesin powder (II) and polyorganosiloxane (III) can be mixed with each other using a Ross mixer, kneader mixer, two-roll mill, three-roll mill, or continuous mixer. Organic solvent can be added to the organic resin modifier according to the present invention and mixed therein using various emulsifying devices and dispersers, e.g., homogenizers, line mixers, ultradispersers, homomixers, nanomizers, microfluidizers, altimizers, and ultrasonic dispersers, or mixing devices such as mixers.

Organic resin compositions comprise (I) an organic resin (II) the fluororesin powder and (III) the polydiorganosiloxane dispersibility improver. The polydiorganosiloxane dispersibility improver will, in general, be used at from 0.1 to 30 weight parts per 100 weight parts of the fluororesin powder (II). The fluororesin powder (II) content may be from 0.01 to 60 weight parts per 100 weight parts organic resin (I). The fluororesin powders preferably have an average particle size of 0.05 to 100 μm.

The organic resin (I) may be exemplified by bisphenol A-type polycarbonate resins, bisphenol Z-type polycarbonate resins, silicone-modified polycarbonate resins, other polycarbonate resins, acrylic resins, styrene resins, copolymer resins of styrene and a (meth)acrylate ester such as methyl acrylate and methyl methacrylate, polyacetal resins, polyester resins, polyurethane resins, polyarylate resins, polysulfone resins phenolic resins, and nylons. These may be used individually or a plural number of resins may be used. Preferably the resins are polycarbonate resins, acrylic resins, polyacetal resins, polyester resins, phenolic resins and nylons.

The polydiorganosiloxane dispersibility improver is an effective dispersibility improver for inducing the dispersion of fluororesin powders in organic resins because it both improves the dispersibility of fluororesin powders in organic resins and stabilizes this dispersibility. The reasons remain unclear as to how the polydiorganosiloxane dispersibility improver functions to improve the dispersibility of fluororesin powders in organic resins. However, since the perfluoroalkyl-functional organic group (B) is compatible with fluororesin powders, the fluorine-free substituent (A) exhibits affinity for organic resins, and the polyorganosiloxane chain is itself very flexible, it is thought that the dispersibility improver becomes interposed between the fluororesin powder and organic resin and thereby accelerates the dispersion of fluororesin powders in organic resins and also functions to prevent aggregation of the fluororesin powder. As a result, water repellency and oil repellency of the organic resin is improved.

Organic resin compositions can be prepared simply by mixing polydiorganosiloxane dispersibility improver (III), fluororesin powder (II), and organic resin (I) with each other. For example, a preliminarily prepared mixture of component (II) and the polydiorganosiloxane dispersibility improver (III) (i.e. organic resin modifier) can be mixed into component (I); or component (II) and the polydiorganosiloxane dispersibility improver (III) can be directly blended into component (I); or component (I) can be preliminarily dissolved in organic solvent and component (II) and the polydiorganosiloxane dispersibility improver (III) can then be mixed to homogeneity into the organic solvent solution of component (I).

Various emulsifying devices and dispersers, e.g., homogenizers, line mixers, ultradispersers, homomixers, nanomizers, microfluidizers, altimizers, and ultrasonic dispersers, or mixing devices such as mixers, can be used as the means for mixing component (II), component (I), and the polydiorganosiloxane dispersibility improver (III) with each other.

The polydiorganosiloxane dispersibility improver, when present in organic resin along with a fluororesin powder, characteristically has the ability to induce a uniform dispersion of the fluororesin powder in the organic resin. Organic resin compositions according to the present invention are characterized by their ability to form uniform and transparent coatings that have an excellent surface lubricity.

EXAMPLES

So that those skilled in the art can understand and appreciate the invention taught herein, the following examples are presented, it being understood that these examples should not be used to limit the scope of this invention found in the claims. In the following examples "parts" denotes "weight parts". The average particle size values reported in the examples for the fluororesin powders that were dispersed in the organic resins were measured using a Coulter Model N4MD instrument for measuring particle size from Coulter Electronics, Inc. The contact angles versus water, methylene iodide, and hexadecane were measured using a CA-Z contact angle meter from Kyowa Kaimen Kagaku Kabushiki Kaisha.

Synthesis Example 1

3.23 g polyorganosiloxane with the following average compositional formula (hereafter designated as P1)

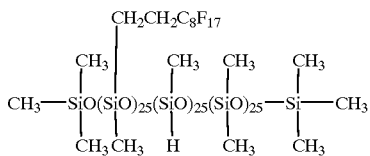

20 ppm chloroplatinic acid (5% isopropyl alcohol solution), 12.6 g allyl-functional polyoxyethylene with the formula $CH_2=CHCH_2O(C_2H_4O)_{24}(C_3H_6O)_{24}CH_3$, and 80 g m-xylene hexafluoride were placed in a flask and gradually heated. The reaction was continued for 6 hours at a temperature of 80° C. The low-boiling components and solvent were then removed by dropping the pressure to 20 torr at 140° C. Analysis of the resulting reaction product by $^{29}$Si-NMR, $^{13}$C-NMR, and FT-IR confirmed it to be polydiorganosiloxane with the following average compositional formula (hereafter designated as P2).

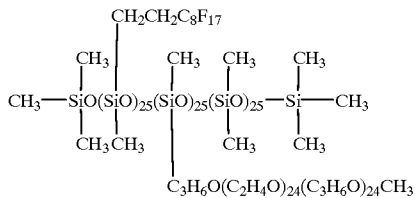

Synthesis Example 2

Polydiorganosiloxane with the following average compositional formula (hereafter designated as P3)

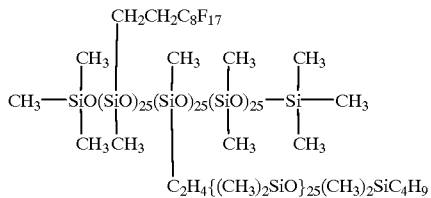

was synthesized according to the procedure described in Synthesis Example 1, but in this case using 10.35 g of the dimethylpolysiloxane with the formula $CH_2=CH\{(CH_3)_2SiO\}_{25}(CH_3)_2SiC_4H_9$ in place of the 12.6 g allyl-functional polyoxyethylene.

Synthesis Example 3

Polydiorganosiloxane with the following average compositional formula (hereafter designated as P4)

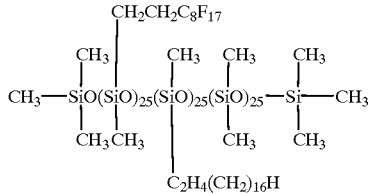

was synthesized according to the procedure described in Synthesis Example 1, but in this case using 6.46 g of the polyorganosiloxane P1 used in Synthesis Example 1 and 2.51 g of the α-olefin $CH_2=CHC_{16}H_{33}$ in place of the 12.6 g allyl-functional polyoxyethylene used in Synthesis Example 1.

Example 1

10 parts bisphenol Z-type polycarbonate resin (trade name: Z200, from Mitsubishi Gas Chemical Co., Inc.) was dissolved in 100 parts chlorobenzene followed by the addition with mixing with vigorous agitation of tetrafluoroethylene resin powder (DAIKIN-POLYFLON PTFE Lowpolymers, from Daikin Industries, Ltd., primary particle size=5 μm, secondary particle size=0.3 μm) and 0.1 part of the polydiorganosiloxane (P2) prepared in Synthesis Example 1. This mixture was passed once through a microfluidizer (M-110Y from Mizuho Kogyo Kabushiki Kaisha) at 10,000 psi to yield a homogeneous liquid dispersion. This liquid dispersion was placed in a glass bottle and allowed to stand for 10 minutes, at which time its appearance was visually evaluated. Separation into a liquid layer and sediment layer was not observed. Measurement of the particle size of the dispersed particles (tetrafluoroethylene resin powder) in the liquid dispersion gave an average particle size of 161 nm. A uniform and transparent coating was obtained when this liquid was coated on a glass slide and dried in an oven. The measurement results are reported in Table 1.

Example 2

A liquid dispersion was prepared as in Example 1, but using the polydiorganosiloxane (P3) prepared in Synthesis Example 2 in place of the polydiorganosiloxane (P2). This liquid dispersion was also placed in a glass bottle and allowed to stand for 10 minutes, at which point the appearance was visually inspected. Separation into a liquid layer and sediment layer was not observed. Measurement of the particle size of the dispersed particles (tetrafluoroethylene resin powder) in the liquid dispersion gave an average particle size of 175 nm. A uniform and transparent coating was obtained when this liquid was coated on a glass slide and dried in an oven. The measurement results are reported in Table 1.

Example 3

A liquid dispersion was prepared as in Example 1, but using the polysiloxane (P4) prepared in Synthesis Example 3 in place of the polydiorganosiloxane (P2). This liquid dispersion was also placed in a glass bottle and allowed to stand for 10 minutes, at which point the appearance was visually inspected. Separation into a liquid layer and sediment layer was not observed. Measurement of the particle size of the dispersed particles (tetrafluoroethylene resin powder) in the liquid dispersion gave an average particle size of 170 nm. A uniform and transparent coating was obtained when this liquid was coated on a glass slide and dried in an oven. The measurement results are reported in Table 1.

Comparative Example 1

A liquid dispersion of the polycarbonate resin was prepared as in Example 1, but without adding the polydiorganosiloxane (P2). This liquid dispersion was placed in a glass bottle and allowed to stand for 10 minutes, at which point the appearance was visually inspected. In this case separation into a liquid layer and sediment layer was observed. The average particle size of the dispersed particles in this liquid dispersion was 1,270 nm. A nonuniform and opaque coating was obtained when this liquid was coated on a glass slide and dried in an oven. The measurement results are reported in Table 1.

TABLE 1

|  | Example 1 | Example 2 | Example 3 | Comparative Example 1 |
|---|---|---|---|---|
| status of the dispersion separation into a liquid layer and sediment layer | excellent absent | excellent absent | excellent absent | poor present |
| average particle size (nm) | 161 | 175 | 170 | 1270 |
| condition of the coating | uniform | uniform | uniform | nonuniform |

Example 4

10 g tetrafluoroethylene resin powder (trade name: DAIKIN-POLYFLON PTFE Lowpolymers, from Daikin Industries, Ltd., primary particle size=5 $\mu$m, secondary particle size=0.3 $\mu$m) was mixed with 100 g chlorobenzene and 1 g of the polyorganosiloxane (P3) produced in Synthesis Example 2. This mixture was passed once through a microfluidizer (M-110Y from Mizuho Kogyo Kabushiki Kaisha) at 10,000 psi to yield an organic resin modifier in chlorobenzene solution ("solution M1").

A 10% solution of polycarbonate resin in chlorobenzene was prepared by dissolving 100 g bisphenol Z-type polycarbonate resin (trade name: Z200, from Mitsubishi Gas Chemical Co., Inc.) in 1 kg chlorobenzene. 11 parts of solution M1 were mixed to homogeneity into 100 parts of the 10% solution of polycarbonate resin in chlorobenzene. The average particle size of the tetrafluoroethylene resin powder in the resulting mixed liquid was 170 nm. A uniform and transparent polycarbonate resin coating was produced when a portion of this mixed liquid was applied on a glass slide and dried in an oven. The contact angles afforded by this coating were measured with the following results: 106° against water, 61° against methylene iodide, and 53° against hexadecane.

Comparative Example 2

A polycarbonate resin coating was prepared as in Example 4, but in this case without the admixture of the chlorobenzene solution of organic resin modifier (solution M1). This coating gave the following contact angles: 90° against water, 37° against methylene iodide, and 20° against hexadecane.

Comparative Example 3

10 g tetrafluoroethylene resin powder (trade name: DAIKIN-POLYFLON PTFE Lowpolymers, from Daikin Industries, Ltd., primary particle size=5 $\mu$m, secondary particle size=0.3 $\mu$m) was mixed with 100 g chlorobenzene and this mixture was passed once through a microfluidizer (M-110Y from Mizuho Kogyo Kabushiki Kaisha) at 10,000 psi to yield an organic resin modifier. When this organic resin modifier was dissolved in 1 kg chlorobenzene along with 100 g bisphenol Z-type polycarbonate resin (trade name: Z200, from Mitsubishi Gas Chemical Co., Inc.), the tetrafluoroethylene resin powder was observed to settle, which was indicative of a poor dispersibility. An opaque coating was produced when a portion of the aforesaid mixed polycarbonate resin solution was applied on a glass slide and dried in an oven.

Example 5

10g tetrafluoroethylene resin powder (trade name: DAIKIN-POLYFLON PTFE Lowpolymers, from Daikin Industries, Ltd., primary particle size=5 $\mu$m, secondary particle size=0.3 $\mu$m) and 1 g of the polyorganosiloxane prepared in Synthesis Example 1 were mixed in a mortar for 3 minutes to prepare an organic resin modifier (M2).

A 10% solution of polycarbonate resin in chlorobenzene was prepared by dissolving 100 g bisphenol Z-type polycarbonate resin (trade name: Z200, from Mitsubishi Gas Chemical Co., Inc.) in 1 kg chlorobenzene. 11 parts of the organic resin modifier (M2) were blended into 100 parts of the 10% solution of polycarbonate resin in chlorobenzene. These components were then mixed by a single pass through a microfluidizer (M-110Y from Mizuho Kogyo Kabushiki Kaisha) at 10,000 psi. The average particle size of the tetrafluoroethylene resin powder in the resulting mixed liquid was 180 nm. A uniform polycarbonate resin coating was produced when a portion of this mixed liquid was applied on a glass slide and dried in an oven. The contact angles afforded by this coating were as follows: 105° against water, 55° against methylene iodide, and 50° against hexadecane.

Example 6

A chlorobenzene solution (solution M3) of an organic resin modifier was prepared as in Example 4, but in this case using 1 g of the polyorganosiloxane prepared in Synthesis Example 3 in place of the polyorganosiloxane (P1) that was used in Example 4. A 10% solution of polycarbonate resin in chlorobenzene was also prepared by dissolving 100 g bisphenol Z-type polycarbonate resin (trade name: Z200, from Mitsubishi Gas Chemical Co., Inc.) in 1 kg chlorobenzene. 11 parts of the solution M3 were mixed to homogeneity into 100 parts of the 10% solution of polycarbonate resin in chlorobenzene. The average particle size of the tetrafluoroethylene resin powder in the resulting mixed liquid was 170 nm. A uniform polycarbonate resin coating was produced when a portion of this mixed liquid was applied on a glass slide and dried in an oven. The contact angles afforded by this coating were as follows: 105° against water, 60° against methylene iodide, and 52° against hexadecane.

Example 7

11 parts solution M1 (prepared in Example 4) and 80 parts toluene were blended and mixed to homogeneity into 20 parts of an acrylic resin solution (trade name: Acrydic A801, from Dainippon Ink Kogyo, 50% nonvolatiles, toluene+butyl acetate solution). A uniform acrylic resin coating was produced when a portion of this mixed liquid was applied on a glass slide and dried in an oven. The contact angles afforded by this coating were as follows: 104° against water, 60° against methylene iodide, and 52° against hexadecane.

Comparative Example 4

10 g tetrafluoroethylene resin powder (trade name: DAIKIN-POLYFLON PTFE Lowpolymers, from Daikin Industries, Ltd., primary particle size=5 $\mu$m, secondary particle size=0.3 $\mu$m) was mixed with 100 g chlorobenzene and this mixture was passed once through a microfluidizer (M-110Y from Mizuho Kogyo Kabushiki Kaisha) at 10,000 psi to yield an organic resin modifier. When this organic resin modifier and 200 g acrylic resin solution (trade name: Acrydic A801, from Dainippon Ink Kogyo, 50% nonvolatiles, toluene+butyl acetate solution) were dissolved in 800 g toluene, the tetrafluoroethylene resin powder was observed to settle, which was indicative of a poor dispersibility. A nonuniform and opaque coating was produced when a portion of this mixed acrylic resin solution was coated on a glass slide and dried in an oven.

What is claimed is:

1. A polydiorganosiloxane dispersibility improver having the average formula:

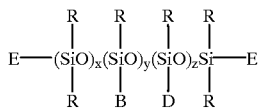

wherein R denotes substituted or unsubstituted monovalent hydrocarbon groups;
B is the perfluoroalkyl-functional organic group with the general formula $F(CF_2)_a—R^1—$ in which $R^1$ is alkylene or alkyleneoxyalkylene and a is an integer with a value of at least 3;
D is an organic group selected from alkyl groups having at least 12 carbon atoms and polydialkylsiloxane chain-containing organic groups;
E is a group selected from R, B, and D;
x is a number with a value from 0 to 500, y is a number from 1 to 500, z is a number from 1 to 500, and (x+y+z) falls in the range from 2 to 1500.

2. The polydiorganosiloxane dispersibility improver as claimed in claim 1, wherein the organic group is an alkyl group having at least 12 carbon atoms.

3. The polydiorganosiloxane dispersibility improver as claimed in claim 1, wherein the organic group is a polydialkylsiloxane chain-containing organic group.

4. The polydiorganosiloxane dispersibility improver as claimed in claim 3, wherein the polydialkylsiloxane chain-containing organic group has the formula:

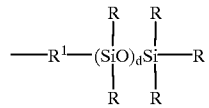

in which $R^1$ is alkylene or alkyleneoxyalkylene, R is a substituted or unsubstituted monovalent hydrocarbon group, and d is an integer with a value from 1 to 500.

5. The polydiorganosiloxane dispersibility improver as claimed in claim 1, wherein subscript a in the formula of the perfluoroalkyl-functional organic group has a value in the range from 4 to 10.

6. An organic resin modifier composition comprising
(II) a fluororesin powder and
(III) a polydiorganosiloxane dispersibility improver wherein the polydiorganosiloxane contains in the pendant position
(A) an organic group selected from the group consisting of polyoxyalkylene-functional organic groups, alkyl groups having at least 12 carbon atoms, and polydialkylsiloxane chain-containing organic groups,
and contains in the pendant position or the molecular chain terminal position,
(B) a perfluoroalkyl-functional organic group with the general formula $F(CF_2)_a—R^1—$ in which $R^1$ is alkylene or alkyleneoxyalkylene and a is an integer with a value of at least 3.

7. The organic resin modifier composition as claimed in claim 6 wherein the fluororesin polymer is selected from the group consisting of tetrafluoroethylene resin powders, chlorotrifluoroethylene resin powders, tetrafluoroethylene-hexafluoroethylenepropylene resin powders, vinyl fluoride resin powders, vinylidene fluoride resin powders, and dichlorodifluoroethylene resin powders.

8. The organic resin modifier composition as claimed in claim 6 wherein the composition additionally comprises an organic solvent.

9. The organic resin modifier composition as claimed in claim 6 where in the polydiorganosiloxane (III) is present at 0.1 to 30 weight parts per 100 weight parts fluororesin powder (II).

10. An organic resin composition comprising
(I) an organic resin
(II) a fluororesin powder and
(III) a polydiorganosiloxane dispersibility improver wherein the polydiorganosiloxane contains in the pendant position
(A) an organic group selected from the group consisting of polyoxyalkylene-functional organic groups, alkyl groups having at least 12 carbon atoms, and polydialkylsiloxane chain-containing organic groups,
and contains in the pendant position or the molecular chain terminal position,
(B) a perfluoroalkyl-functional organic group with the general formula $F(CF_2)_a—R^1—$ in which $R^1$ is alkylene or alkyleneoxyalkylene and a is an integer with a value of at least 3.

11. The organic resin composition as claimed in claim 10 wherein the organic resin is selected from the group consisting of bisphenol A-type polycarbonate resins, bisphenol Z-type polycarbonate resins, silicon-modified polycarbonate resins, acrylic resins, styrene resins, copolymer resins of styrene and a (meth)acrylate ester, polyacetal resins, polyester resins, polyurethane resins, polyarylate resins, polysulfone resins phenolic resins, and nylons.

12. The organic resin composition as claimed in claim 10 wherein (III) is present in an amount from 0.1 to 30 weight parts per 100 weight parts of (II).

13. The organic resin composition as claimed in claim 10 wherein (II) is present in an amount from 0.01 to 60 weight parts per 100 weight parts (I).

14. The organic resin composition as claimed in claim 10 wherein there is additionally present an organic solvent.

* * * * *